United States Patent
Zuccotti et al.

(10) Patent No.: US 9,878,815 B2
(45) Date of Patent: Jan. 30, 2018

(54) UNIT FOR THE APPLICATION OF OPENING DEVICES ON SEALED PACKAGES OF FOOD PRODUCTS

(71) Applicant: TETRA LAVAL HOLDINGS & FINANCE S.A., Pully (CH)

(72) Inventors: Alessandro Zuccotti, Modena (IT);
Pierluigi Canalini, Modena (IT);
Maurizio Montorsi, Modena (IT);
Federico Zanichelli, Ponte Motta de Cavezzo (IT)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 453 days.

(21) Appl. No.: 14/437,397

(22) PCT Filed: Dec. 23, 2013

(86) PCT No.: PCT/IB2013/061293
§ 371 (c)(1),
(2) Date: Apr. 21, 2015

(87) PCT Pub. No.: WO2014/097275
PCT Pub. Date: Jun. 26, 2014

(65) Prior Publication Data
US 2015/0274342 A1    Oct. 1, 2015

(30) Foreign Application Priority Data

Dec. 21, 2012 (EP) .................................... 12199304

(51) Int. Cl.
*B65B 61/18* (2006.01)
*B65B 7/28* (2006.01)
*B65B 57/02* (2006.01)

(52) U.S. Cl.
CPC .............. *B65B 61/186* (2013.01); *B65B 7/28* (2013.01); *B65B 57/02* (2013.01)

(58) Field of Classification Search
CPC ....... B65B 7/28; B65B 7/2807; B65B 7/2842; B65B 57/02; B65B 61/18; B65B 61/186
(Continued)

(56) References Cited

U.S. PATENT DOCUMENTS 6,321,813 B1 * 11/2001 Miyajima et al. ...... B29C 65/02
53/133.2
7,677,012 B2 * 3/2010 Cavilli et al. ......... B65B 61/186
53/133.2

(Continued)

FOREIGN PATENT DOCUMENTS

EP    1 462 371 A1    9/2004
EP    1 462 372 A1    9/2004
(Continued)

OTHER PUBLICATIONS

International Search Report (PCT/ISA/210) dated Jul. 18, 2014, by the WIPO Patent Office as the International Searching Authority for International Application No. PCT/IB2013/061293, 4 pages.
(Continued)

*Primary Examiner* — Stephen F Gerrity
(74) *Attorney, Agent, or Firm* — Buchanan Ingersoll & Rooney PC

(57) ABSTRACT

A unit for the application of opening devices on respective sealed first packages of food products, comprising: at least one first gripping device configured to receive, in use, a relative opening device and movable along a first path; the first path comprising a first stretch in which the opening device is applied onto the package; a first track; a first transfer element, which is operatively connected to the first gripping device; and at least one second transfer element;
(Continued)

the first transfer element is movable along the first track and is movable relative to and independently of second transfer element.

27 Claims, 14 Drawing Sheets

(58) Field of Classification Search
USPC .................. 53/133.2; 493/212–214, 962
See application file for complete search history.

(56) References Cited

U.S. PATENT DOCUMENTS

| | | | |
|---|---|---|---|
| 7,762,043 B2* | 7/2010 | Skarin et al. | B65B 61/186 53/133.2 |
| 8,161,713 B2 | 4/2012 | Skarin et al. | |
| 8,371,023 B2* | 2/2013 | Kishimoto | B31B 70/00 53/133.2 |
| 8,920,297 B2 | 12/2014 | Maccagnani et al. | |
| 2005/0173438 A1 | 8/2005 | Berggren | |
| 2010/0218456 A1 | 9/2010 | Skarin et al. | |
| 2011/0203223 A1* | 8/2011 | Maccagnani et al. | B65B 61/186 53/111 R |
| 2011/0203225 A1 | 8/2011 | MacCagnani et al. | |

FOREIGN PATENT DOCUMENTS

| | | |
|---|---|---|
| EP | 1 813 533 A1 | 8/2007 |
| RU | 2516136 C2 | 5/2014 |
| WO | WO 03/057460 A1 | 7/2003 |
| WO | WO 2010/066691 A1 | 6/2010 |

OTHER PUBLICATIONS

Written Opinion (PCT/ISA/237) dated Jul. 18, 2014, by the WIPO Patent Office as the International Searching Authority for International Application No. PCT/IB2013/061293, 3 pages.

Office Action issued by the Russian Patent Office dated Oct. 30, 2017 in corresponding Russian Application No. 2015120817, and English language translation of Office Action (20 pages).

* cited by examiner

UNIT FOR THE APPLICATION OF OPENING DEVICES ON SEALED PACKAGES OF FOOD PRODUCTS

TECHNICAL FIELD

The present invention relates to a unit for the application of opening devices on sealed packages of food products.

BACKGROUND ART

As is known, many pourable food products, such as fruit juice, UHT (ultra-high-temperature treated) milk, wine, tomato sauce, etc., are commercially available in sealed packages made of a packaging material that has previously been sterilised.

A typical example of this type of package is the parallelepiped-shaped package for liquid or pourable food products known as Tetra Brik Aseptic (registered trademark), which is made by folding and sealing laminated strip packaging material.

The packaging material has a multi-layer structure substantially comprising a base layer for stiffness and strength, which may comprise a layer of fibrous material, e.g. paper, or of mineral-filled polypropylene material, and a number of layers of heat-seal plastic material, e.g. polyethylene film, covering both sides of the base layer.

In the case of aseptic packages for long-storage products, such as UHT milk, the packaging material also comprises a layer of gas- and light-barrier material, e.g. aluminium foil or ethyl vinyl alcohol (EVOH), which is superimposed on a layer of heat-seal plastic material, and is in turn covered with another layer of heat-seal plastic material forming the inner face of the package eventually contacting the food product.

As is known, packages of this sort are produced on fully automatic packaging machines, on which a continuous tube is formed from the web-fed packaging material; the web of packaging material is sterilized on the packaging machine, e.g. by applying a chemical sterilizing agent, such as a hydrogen peroxide solution. Once sterilization is completed, the sterilization agent is removed from the surfaces of the packaging material, e.g. evaporated by heating. The web of packaging material sterilized in this manner is maintained in a closed, sterile environment, and is folded and sealed longitudinally to form a vertical tube.

The tube is filled with the sterilized or sterile-processed food product, and is sealed at equally spaced cross sections, along which it is eventually cut to form the packs. These pillow-shaped packs are then folded mechanically to form finished, e.g. substantially parallelepiped-shaped, packages.

Alternatively, the packaging material may be cut into blanks, which are formed into packages on forming spindles. These packages are filled with the food product and sealed. One example of this type of package is the so-called "gable-top" package known by the trade name Tetra Rex (registered trademark).

Once formed, the aforementioned packages may undergo further processing, such as applying a reclosable opening device to enable the product to be poured out.

At present, the most commonly marketed opening devices comprise a frame defining a pour opening and fitted about a pierceable or tear-off portion of a top wall of the package, and a cap hinged or screwed to the frame, which is removable to open the package; as an alternative, the use of different types of opening devices, such as slidingly operated opening devices, are also known.

The pierceable portion of the package may be defined e.g. by a so-called "prelaminated" hole, i.e. a hole formed in the base layer of the packaging material before coupling this layer with the layer of barrier material, which is therefore intact and closes the hole itself, thus ensuring hermetic sealing and asepsis although resulting easy to perforate.

In the case of aseptic packaging machines, the opening devices are normally fitted directly to the packages, after they are formed, in units placed on the production line downstream from the packaging machine.

The aforementioned units substantially comprise a gluing assembly within which a fastening portion of the opening devices is coated with a layer of adhesive, an application assembly within which the opening devices are applied on respective packages and a pressure assembly within which the opening devices are pressed on the respective packages for a time required to allow the cooling of the adhesive and the complete adhesion of each opening device on the corresponding package.

Application assemblies are known, e.g. from patent EP1813533, comprising a first linear conveyor adapted to feed a sequence of packages along a first rectilinear path, a second linear conveyor adapted to feed a sequence of opening devices along a second rectilinear path, and a rotating carousel conveyor comprising a plurality of gripping members and which is adapted to carry the opening devices from a withdrawal station to an application station of the opening devices on the respective packages.

Each gripping member is movably constrained to the carousel conveyor radially to a rotation axis of the carousel conveyor between a retracted position and an advanced position.

More specifically, each gripping member is placed at a maximum and at a minimum radial distance from the axis of the carousel conveyor respectively in the corresponding advanced and retracted position.

Each gripping member is arranged in the advanced position when it withdraws the opening device from the first conveyor, it is advanced in the retracted position by the carousel conveyor, and it is arranged in the advanced position when it applies the opening device onto the corresponding package.

Specifically, each gripping member applies the opening device on the corresponding package in a direction perpendicular to a top wall of the package and radial with respect to the axis of the carousel conveyor, so as to arrange the flat fastening area of the opening device parallel to and in contact with the top wall of the package itself.

Although reliable and effective, the disclosed application assemblies may further be improved.

Specifically, a need is felt within the sector to enhance the flexibility of the application assembly, under several points of view.

In particular, a need is felt to process differently shaped opening devices and/or to apply the adhesive substance along differently shaped patterns, without substantially reconfiguring the gluing assembly and the application assembly.

A need is also felt to render the cycle-time of the gluing assembly as independent as possible of the cycle-time of the application assembly.

Furthermore, a need is felt to increase the throughput of the unit up to values of more than 40000 packages/hour.

Finally, a need is felt to reduce as far as possible the pitch between the package processed by the application assembly, without impairing the precision of the coating with the adhesive substance and/or of the application of the opening device to the package.

DISCLOSURE OF INVENTION

It is an object of the present invention to provide a unit for the application of opening devices on sealed packages of food products allowing to meet at least one of the aforementioned needs in a simple and cost-effective manner.

BRIEF DESCRIPTION OF THE DRAWINGS

Seven preferred embodiments are hereinafter disclosed for a better understanding of the present invention, by way of non-limitative example and with reference to the accompanying drawings, in which.

BEST MODE FOR CARRYING OUT THE INVENTION

Figure 1:
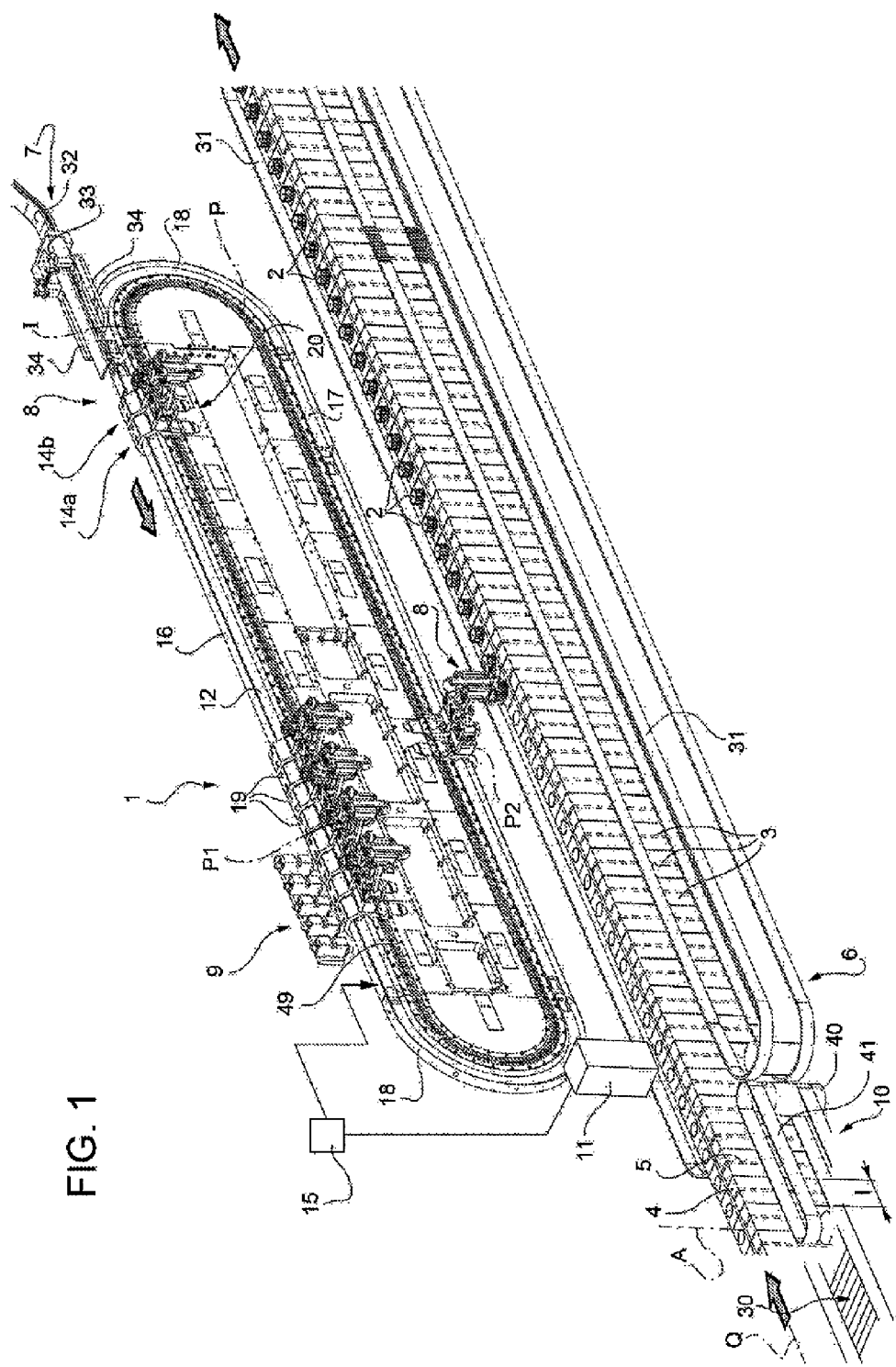
FIG. 1 is a perspective view of a first embodiment of a unit for the application of opening devices on packages of food products made according to the present invention, with parts removed for the sake of clarity.
Figure 2:
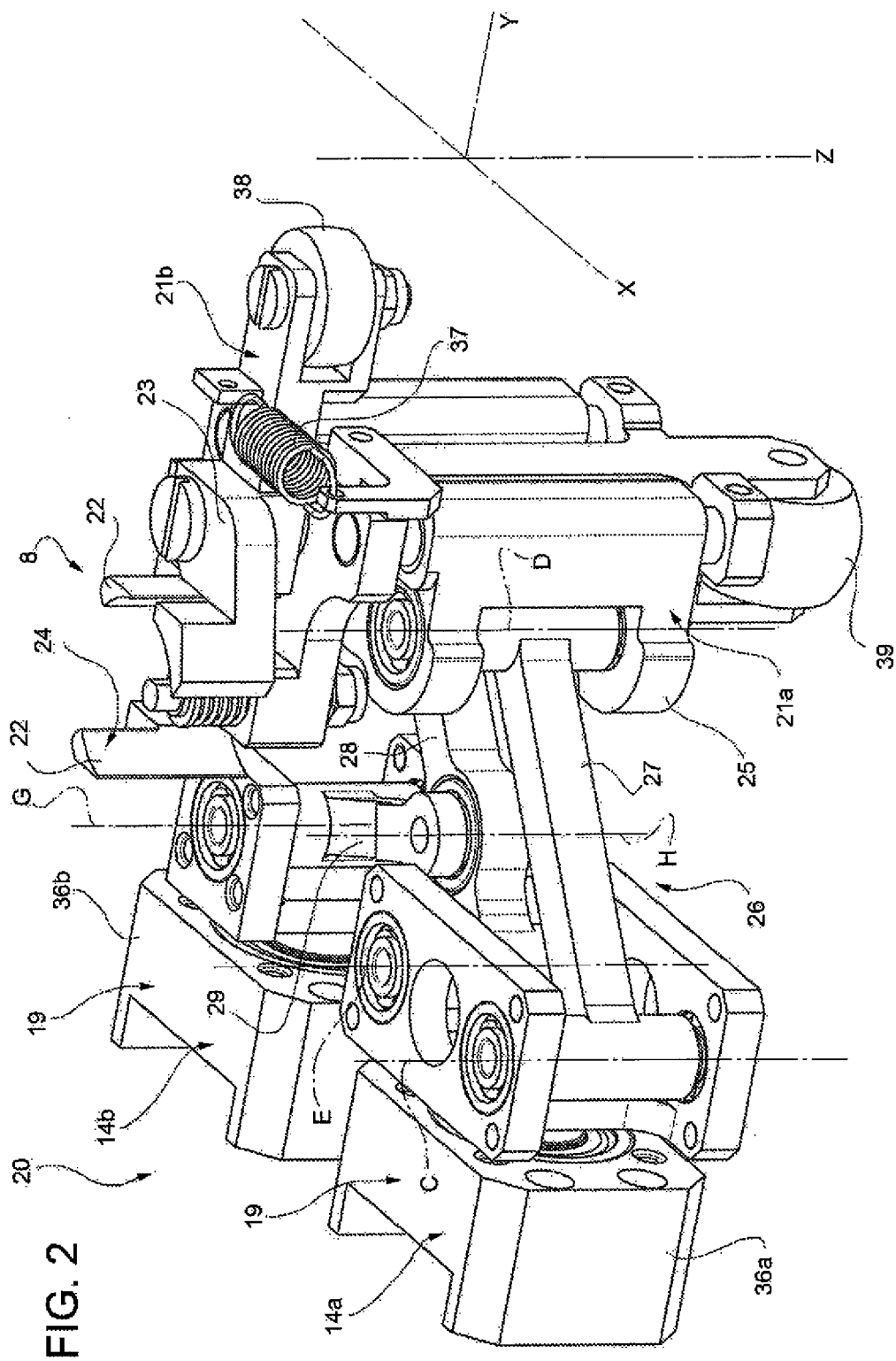
FIG. 2 is an enlarged perspective view of a gripping device of the unit of FIG. 1.
Figure 3:
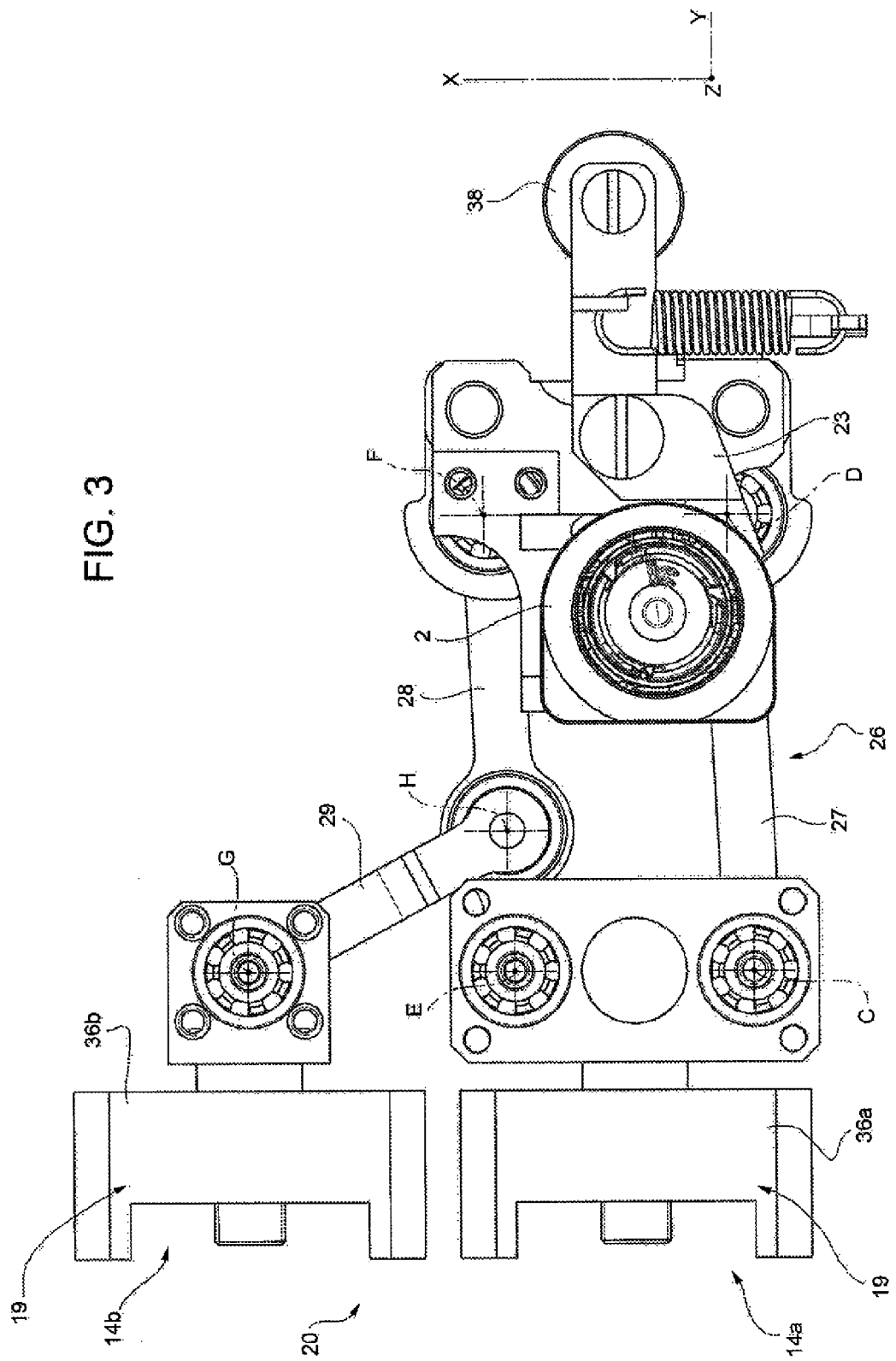
FIG. 3 is a top view of the gripping device of FIG. 2.

With reference to FIGS. 1 to 3, numeral 1 indicates a unit for the application of opening devices 2 on sealed packages 3 of food products pourable into a tube of packaging material.

Packages 3 are produced upstream of unit 1 by a packaging machine from a sheet packaging material comprising a base layer, e.g. formed by cardboard-like fibrous material or mineral-filled polypropylene material, and a number of layers of heat-seal plastic material, e.g. polyethylene film, covering both sides of the base layer. When packages 3 are intended for aseptic packaging of long-storage products, such as UHT milk, the packaging material also comprises a layer of gas- and light-barrier material, e.g. aluminium foil or ethyl vinyl alcohol (EVOH), which is superimposed on a layer of heat-seal plastic material, and is in turn covered with another layer of heat-seal plastic material forming the inner face of packages 3 eventually contacting the food product.

Preferably, the machine manufactures sealed packages 3 containing a pourable food product, such as UHT or pasteurised milk, fruit juice, wine, etc.

The packaging machine could also manufacture sealed packages 3 containing a food product, which may be poured within the tube of packaging material during the step of manufacturing packages 3 and subsequently hardens upon sealing of aforementioned packages 3. An example of the latter food product is a portion of cheese, which is melted during the step of manufacturing packages 3 and subsequently hardens upon sealing of aforementioned packages 3.

Each opening device 2 is adapted to be applied on a package 3 at a removable portion thereof, i.e. a portion detachable from the remaining part of that package 3 to allow the outflow of the pourable product.

The removable portion may consist of a sealing sheet applied by gluing or heat sealing on package 3 to close a through-hole thereof; as an alternative, the removable portion may be defined by a so-called "prelaminated" hole, i.e. a hole formed in the base layer of the packaging material and closed hermetically by other layers (at least the layers of thermoplastic material) of the packaging material.

Each package 3 is, in the embodiment shown, parallelepiped and extends along an axis A.

Each package 3 has a top wall 4 onto which a respective opening device 2 is applied by unit 1 and a bottom wall opposite to wall 4.

Furthermore, each package 3 has a pair of lateral walls 5 parallel to axis A and extending orthogonally between wall 4 and the bottom wall.

Top wall 4 lies, in the embodiment shown, in a plane orthogonal to axis A and is, therefore, horizontal.

Unit 1 substantially comprises:
- conveying means 6 for conveying packages 3 along a path Q, rectilinear in the embodiment shown;
- a plurality of gripping devices 8 which cyclically move along a closed path P, receive relative opening devices 2 at a station I of path P and apply the relative opening devices 2;
- an infeed assembly 7 for feeding opening devices 2 to gripping device 8 at station I of path P; and
- a gluing assembly 9 for applying a layer of an adhesive substance onto fastening portions of respective opening devices 2 along a stretch P1 of path P.

Conveying means 6 comprise:
- a linear conveyor 30 which extends along path Q and cooperates with bottom walls of packages 3; and
- a pair of endless belt conveyors 31 arranged on respective lateral sides of conveyor 30 and adapted to interact with respective walls 5 of packages 3 advancing on conveyor 30.

Gripping devices 8 apply opening devices 2 to relative packages 3 at a stretch P2 of path P arranged downstream of stretch P1, proceeding according to the advancing direction of gripping devices 8 along path P.

Stretches P1, P2 are parallel to each other and superimposed to path Q.

In the embodiment shown, stretches P1, P2 are orthogonal to axis A.

Infeed assembly 7 substantially comprises:
- a conveyor 32, a chute in the embodiment shown, for advancing opening devices 2 towards station I;
- a stop device 33 for stopping opening device 2; and
- a pair of belts 34 having respective spaced not-shown paddles which interacts with opening devices 2 downstream of stop device 33.

Paddles are adapted to sequence opening devices 2 at a given pitch upstream of station I.

Gluing assembly 9 is supported by a not-shown fixed structure of unit 1. In particular, gluing assembly 9 is arranged above stretch P1 of path P.

In the embodiment shown, gluing assembly 9 reciprocates parallel to path Q in order to follow gripping devices 8 which move along stretch P1.

Alternatively, gluing assembly 9 is fixed to the not-shown structure of unit 1.

Gluing assembly 9 comprises a plurality of guns for applying the adhesive onto respective opening devices 2 along a given pattern.

Unit 1 also comprises:
- a sequencing mechanism 10 interacting with packages 3 travelling along path Q; and
- a sensor 11 for generating a signal associated to the position of packages 3.

Furthermore, unit 1 comprises:
- an endless track 12;
- a plurality of transfer elements 14a, 14b operatively connected to gripping devices 8; and
- a control unit 15 which controls transfer elements 14a, 14b on the basis of the signal generated by sensor 11.

In detail, sequencing mechanism 10 interacts with packages 3, so as to:
- either forming a queue of packages 3 substantially with no gap therebetween, if a length L of packages 3 measured along path Q is greater than the minimum pitch between transfer elements 14a, 14b; or
- forming a queue of packages 3 spaced by a gap along path Q, if length L is smaller than the minimum pitch between transfer elements 14a, 14b.

Sequencing mechanism 10 comprises:
- a motor 40; and
- at least one belt 41 driven by motor 40, arranged on one side of conveyor 30, and adapted to exert a given grip on wall 5 of relative packages 3.

Sensor 11 comprises a digital camera, in case opening device 2 must be applied onto a pre-laminated hole.

Track 12 is arranged on one lateral side of conveyor 30.

Track 12 also comprises:
- a top rectilinear branch 16 arranged below gluing device 8 and which defines station I and stretch P1 of path P;
- a bottom rectilinear branch 17, which defines stretch P2 of path P; and
- a pair of lateral branches 18 interposed between branches 16, 17.

Branches 16, 17 are parallel to path Q.

Advantageously, transfer elements 14a, 14b are self-movable and move relative to track 12 independently of each other.

More specifically, track 12 houses a stator armature 49 formed by a plurality of individually-excitable solenoids (known per se), and transfer elements 14a, 14b comprise respective carts 19 (FIG. 2) housing respective permanent magnets (known per se and only schematically shown in FIG. 1) and independently moved along track 12 by individually controlling the solenoids by means of control unit 15.

Carts 19 are mounted on track 12.

In the embodiment shown, each gripping device 8 is connected to a pair 20 of subsequent transfer elements 14a, 14b, so as to be movable along a direction X tangential to path P and along a direction Y orthogonal to direction X and to path P. Both directions X, Y are integral to gripping device 8 (FIG. 2).

In this way, each gripping device 8 may move along both directions X, Y relative to gluing assembly 9 along stretch P1, so that the adhesive substance is applied with high precision along a required pattern.

Furthermore, each gripping device 8 may apply relative opening device 2 onto relative package 3 in the correct position along both directions X, Y, as it travels along stretch P2 of path P.

Still more precisely, the movement of each gripping device 8 is obtained by controlling the speed of transfer elements 14a, 14b relative to track 12 along direction X.

In detail, the movement of each gripping device 8 parallel to direction Y is achieved by moving transfer elements 14a, 14b of corresponding pair 20 at different speeds.

In other words, the variation in the mutual position along direction X between transfer elements 14a, 14b causes the displacement of gripping device 8 along direction Y.

Transfer assemblies 14a, 14b comprise relative connection members 36a, 36b which are connected to relative cart 19 and protrude from track 12 on the side of gripping devices 8.

Each gripping device 8 substantially comprises:
- a frame 21a connected to transfer elements 14a, 14b of respective pair 20 by means of a leverage 26;
- a body 21b which may slide relative to frame 21a relative to a direction Z integral with gripping device 8 and orthogonal to directions X, Y between a retracted position and an extracted position;
- a pair of fixed jaws 22 protruding from body 21b; and
- a movable jaw 23 hinged to body 21b about an axis parallel to direction Z.

In detail, frame 21a defines a pair of cylindrical seats having respective axes parallel to direction Z and body 21b comprises a pair of columns slidably engaging the respective above-mentioned cylindrical seats parallel to direction Z.

Jaw 23 is movable between a closed position in which it defines together with jaws 22 a seat 24 within which a relative opening device 2 is retained, and an open position in which it is parted from jaws 22 to permit engagement and release of relative opening device 2.

Furthermore, jaw 23 is elastically loaded by a spring 37 towards the closed position and is connected to a cam follower 38 which interacts with a not-shown cam for moving jaw 23 from the closed position to the open position.

Finally, each gripping device 8 comprises, on the opposite side of jaws 22, 23 a cam-follower 39 which interacts with a further not-shown cam for displacing body 21b parallel to direction Z and relative to frame 21a.

In this way, opening device 2 moves relative to frame 21a and, therefore, relative to transfer assemblies 14a, 14b parallel to direction Z from the retracted position to the extracted position.

The body 21b of each gripping device 8 is, in particular, arranged in the extracted position along stretch P2 and in the retracted position along the remaining part of path P.

Frame 21a of each gripping device 8 also defines, on the side of track 12, an appendix 25.

Leverage 26 comprises:
- a lever 27 hinged to connection member 36a about an axis C and to appendix 25 about an axis D;
- a lever 28 hinged to connection member 36a about an axis E and to appendix 25 about an axis F; and
- a lever 29 hinged to connection member 36b about an axis G and to lever 28 about an axis H.

Axes C, D, E, F, G, H are parallel to each other and to direction Z.

When transfer elements 14a, 14b move away from each other along direction X, due to their differential speeds along path P, levers 27 and 28, 29 tend to be arranged more parallel to direction X (FIG. 2), so as to move gripping device 8 towards track 12 along direction Y.

Conversely, when elements 14a, 14b move towards each other along direction X, levers 27 and 28, 29 tend to be arranged more orthogonal to direction X, so as to move away gripping device 8 from track 12 along direction Y (FIG. 3).

In use, packages 3 advance along path Q on conveyor 30 and interacts with belt 41 of sequencing mechanism 10.

In particular, motor 40 of sequencing mechanism 10 is controlled in order to:
- either forming a queue of packages 3 substantially with no gap therebetween, if length L of packages 3 is greater than the minimum pitch between transfer assemblies 14a, 14b; or
- forming a queue of packages 3 spaced by a gap along path Q, if length L is smaller than the minimum pitch between transfer assemblies 14a, 14b.

The operation of unit 1 is described in the following of the present description with reference to only one package 3, to the corresponding opening devices 2 and to associated transfer elements 14a, 14b of pair 20 and gripping device 8.

Sensor 11 generates a signal associated to the position of the package 3.

On the basis of that signal, control unit 15 controls transfer elements 14a, 14b so as to move gripping device 8 along direction X tangential to path P.

In particular, gripping device 8 is fed with opening device 2 by infeed assembly 7 at station I and conveys opening device 2 along stretch P1 and stretch P2 of path P.

Immediately upstream of station I, jaw 23 is in the open position and body 21b is in the retracted position.

At station I, jaw 23 moves from the open position into the closed position in order to retain, together with jaws 22, opening device 2 inside seat 24.

Gluing assembly 9 applies a layer of adhesive substance onto fastening portion of opening device 2 along stretch P1 of path P.

Immediately upstream of stretch P2, the interaction of not-shown cam with cam follower 39 displaces body 21b in the extracted position.

More precisely, body 21b slides relative to frame 21a parallel to direction Z and towards package 3.

Gripping device 8 applies opening device 2 onto package 3 along stretch P2 of path P.

Along both stretches P1, P2, gripping device 8 is moved along directions X, Y by the control unit 15 and on the basis of the signal generated by sensor 11.

More precisely, the movement of gripping device 8 along direction Y is achieved by moving transfer elements 14a, 14b at different speeds from each other.

In case transfer elements 14a, 14b move away from each other, levers 27 and 28, 29 tend to arrange more parallel to direction X, thus moving gripping device 8 towards track 12 and along direction Y.

In case transfer elements 14a, 14b move towards each other, levers 27 and 28, 29 tend to arrange more parallel to direction Y, thus moving away gripping device 8 from track 12 and along direction Y.

At this point, jaw 23 moves in the open position in which it releases opening device 2 onto package 3.

Figure 4:
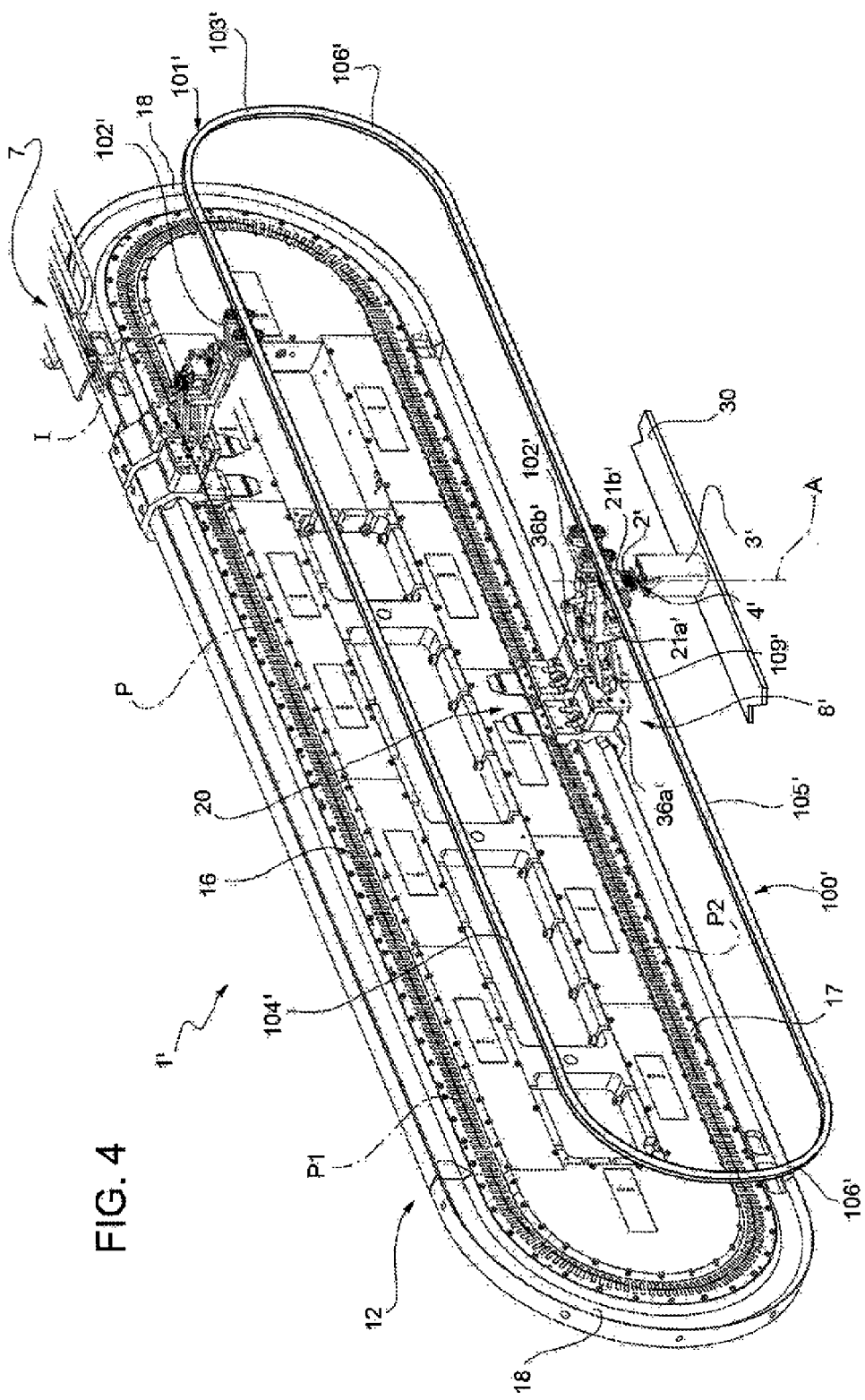
FIG. 4 is a perspective view of a second embodiment of the unit according to the invention.

With reference to FIGS. 4, 1' indicates, as a whole, a unit for the application of opening device 2' to sealed packages 3', according to a second embodiment of the present invention.

The unit 1' is similar to unit 1 and will be described hereinafter only as far as it differs therefrom; corresponding or equivalent parts of units 1, 1' will be indicated where possible by the same reference numbers.

In particular, unit 1' differs from unit 1 for being adapted to apply opening devices 2' onto packages 3' having wall 4' slanted relative to axis A, as shown in FIG. 4.

Furthermore, unit 1' differs from unit 1 for comprising a guide element 100' arranged on the opposite side of track 12 relative to conveyor 30.

In particular, guide element 100' comprises:
- a frame 101'; and
- a plurality of sliders 102' movable on a endless guide 103' defined by frame 101' and connected to respective gripping device 8'.

Sliders 102' are not motorized.

Guide 103' comprises:
- a top branch 104' arranged horizontally in the embodiment shown;
- a bottom branch 105' opposite to branch 104'; and
- a pair of branches 106' interposed between branches 104', 105'.

Branch 104' is parallel to and arranged at the same distance of branch 16 from path Q.

Branch 105' is parallel to branch 16 but is arranged at a different distance of branch 17 from path Q.

Branches 17, 105' are arranged at such a distance from path Q that they lie in a plane parallel to wall 4 and, therefore, slanted relative to axis A.

Gripping device 8' differs from gripping device 8 in that is connected to a relative slider 102' on the side of guide element 100'.

Furthermore, frame 21a' of each gripping device 8' is connected to connection member 36a', 36b' of pairs 20 by respective spherical joint 109' and is hinged to relative slider 102' about direction X.

In this way, each opening device 2' is arranged slanted to axis A and parallel to wall 4', when the corresponding gripping device 8' moves along branches 17, 105' of track 12 and guide element 100' respectively.

The operation of unit 1' is similar to unit 1 and is described only insofar as it differs from that of unit 1.

In greater detail, the operation of unit 1' differs from that of unit 1 in that each gripping device 8' is driven by transfer elements 14a', 14b' of relative pair 20 along path P and slides on guide 103' thanks to relative slider 102'.

In particular, when each gripping device 8' moves along stretch P2 of path P, relative transfer elements 14a', 14b' move along branch 16 of track 12 and relative slider 102' slides on branch 105' of guide 103'.

In this condition, thanks to the fact that it is hinged to slider 102' and may tilt relative to transfer elements 14a', 14b', each gripping device 8' is inclined relative to axis A in such a way that opening device 2' is slanted relative to axis A parallel to wall 4' of package 3' advancing on path Q.

Accordingly, when body 21b' is lowered towards wall 4' and jaws 23 are moved in the open position, opening device 2' is applied to slanted wall 4'.

Figure 5:
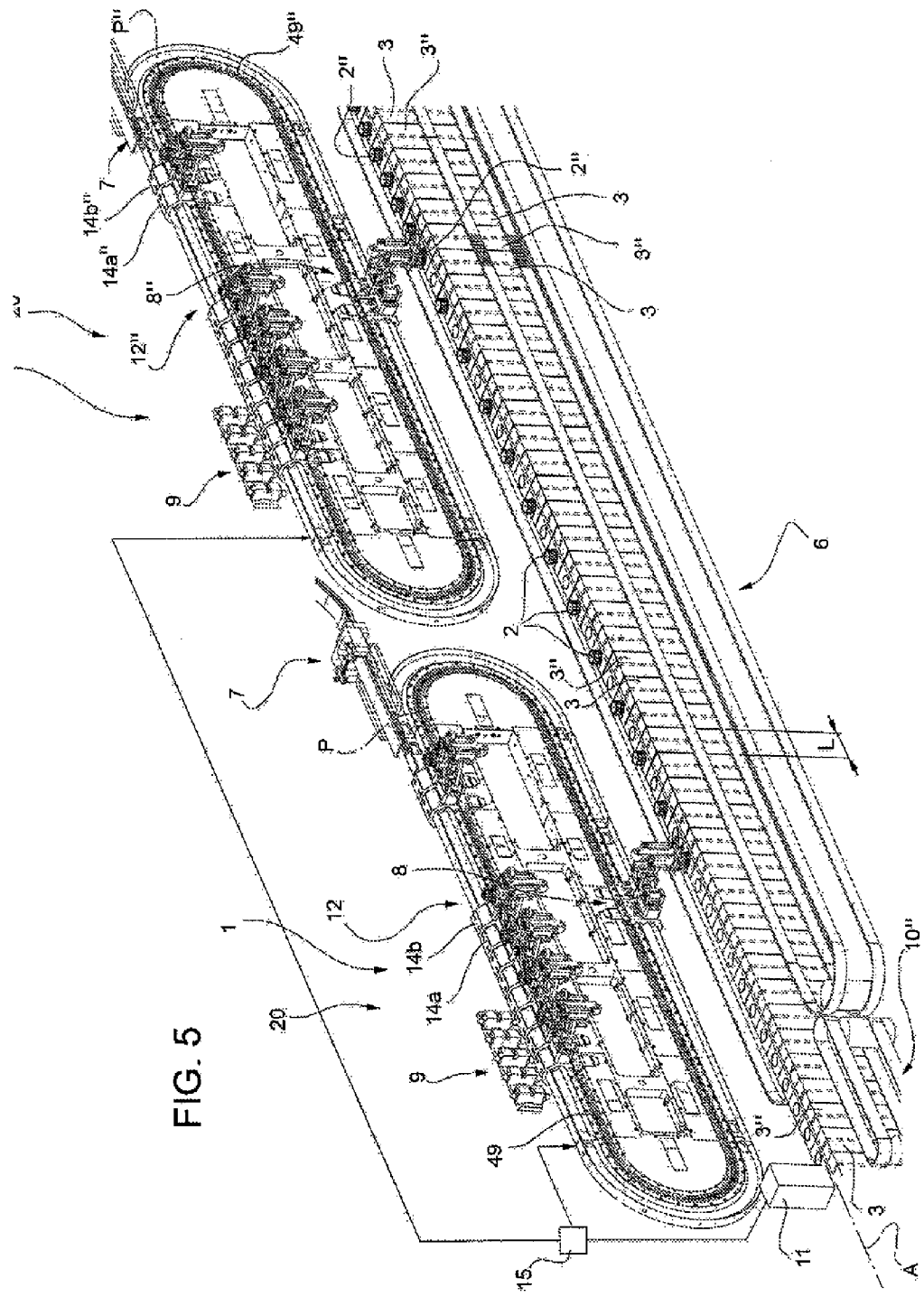
FIG. 5 is a perspective view of a third embodiment of the unit according to the invention.

With reference to FIG. 5, 1" indicates, as a whole, a unit for the application of opening devices 2" to sealed packages 3" according to a third embodiment of the present invention.

The unit 1" is similar to unit 1 and will be described hereinafter only as far as it differs therefrom; corresponding or equivalent parts of units 1, 1" will be indicated where possible by the same reference numbers.

In particular, unit 1" differs from unit 1 for comprising:
a further track 12", which houses a stator armature 49" and is arranged downstream of track 12, proceeding according to the advancing direction of packages 3" along path Q; and
a plurality of transfer elements 14a", 14b" which move along track 12" along a path P" and are operatively connected in pairs 20" to relative gripping devices 8".

In greater detail, conveyor 30 advances along path Q a plurality of pairs of packages 3, 3" immediately subsequent to each other.

Furthermore, gripping devices 8 apply opening devices 2 only to packages 3 of each pair. Furthermore, gripping device 8" apply opening devices 2" only to packages 3" of each pair.

Finally, unit 1" is particularly suitable for applying opening devices 2" to package 3" having length L along path Q smaller than the minimum pitch of transfer elements 14a, 14b on track 12 and of transfer elements 14a", 14b" on track 12".

As a matter of fact, due to the fact that gripping devices 8 (8") apply opening devices 2 (2") to respective package 3 (3"), there is no need to create a gap between packages 3, 3' parallel to path Q.

Accordingly, sequencing mechanism 10" is preferably controlled for creating a queue of packages 3, 3" without any gap therebetween.

The operation of unit 1" is similar to unit 1 and is described only insofar as it differs from that of unit 1.

In particular, gripping devices 8 apply opening respective devices 2 onto corresponding packages 3 and gripping devices 8" apply respective opening devices 2" onto corresponding packages 3".

Figure 6:
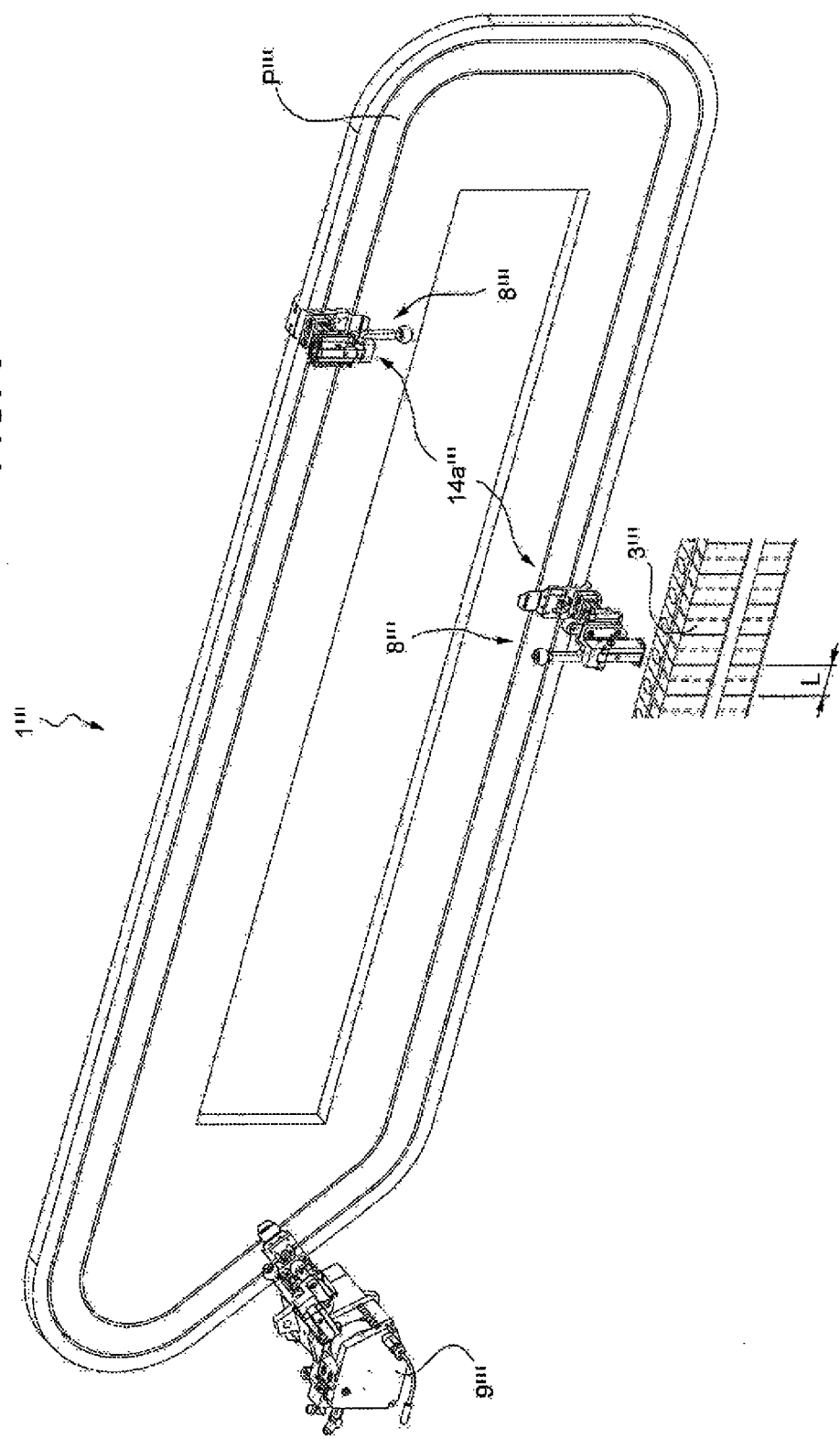
FIG. 6 is a perspective view of a fourth embodiment of the unit according to the invention.
Figure 7:
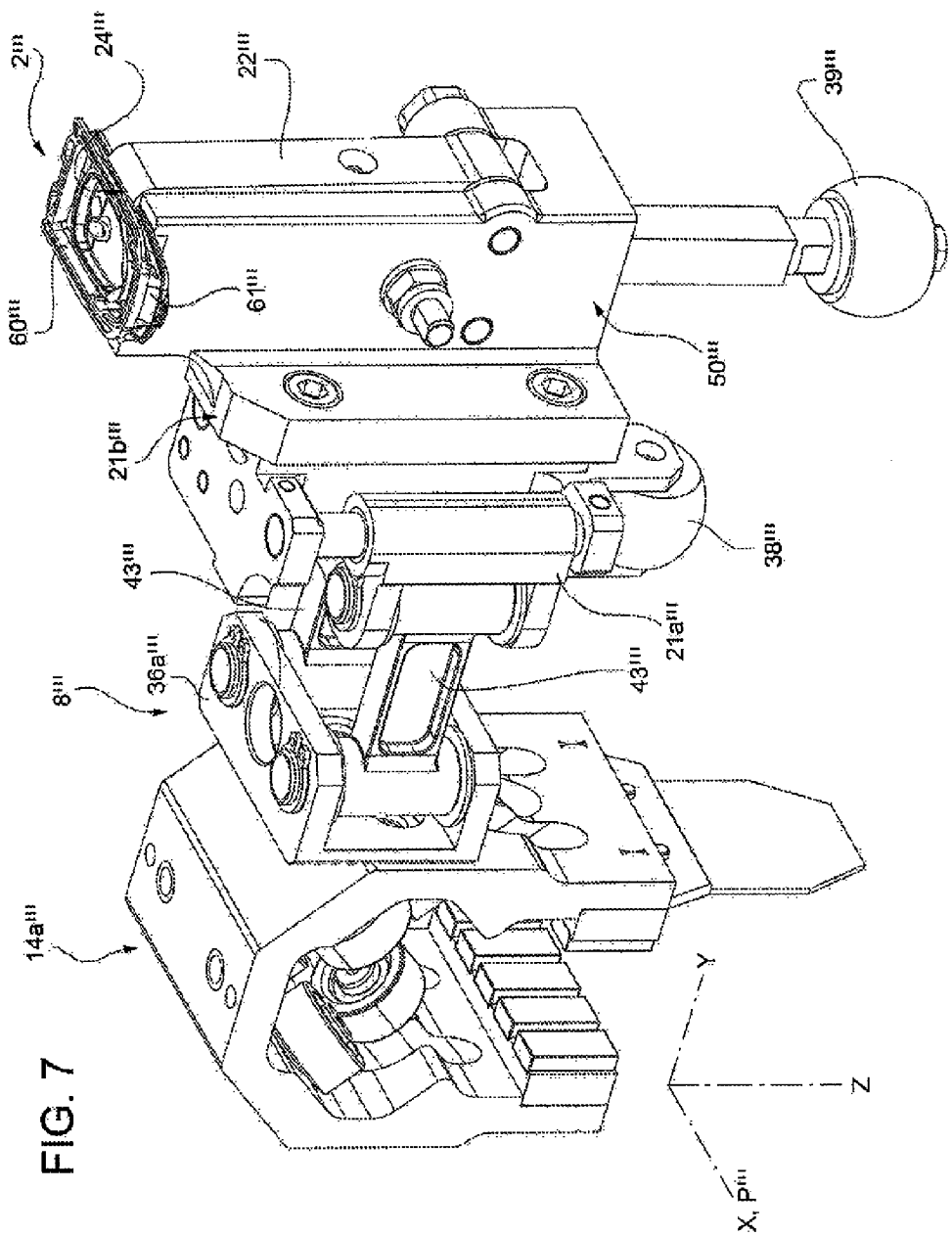
FIG. 7 is a perspective enlarged view of a gripping device of the unit of FIG. 7.
Figure 8:
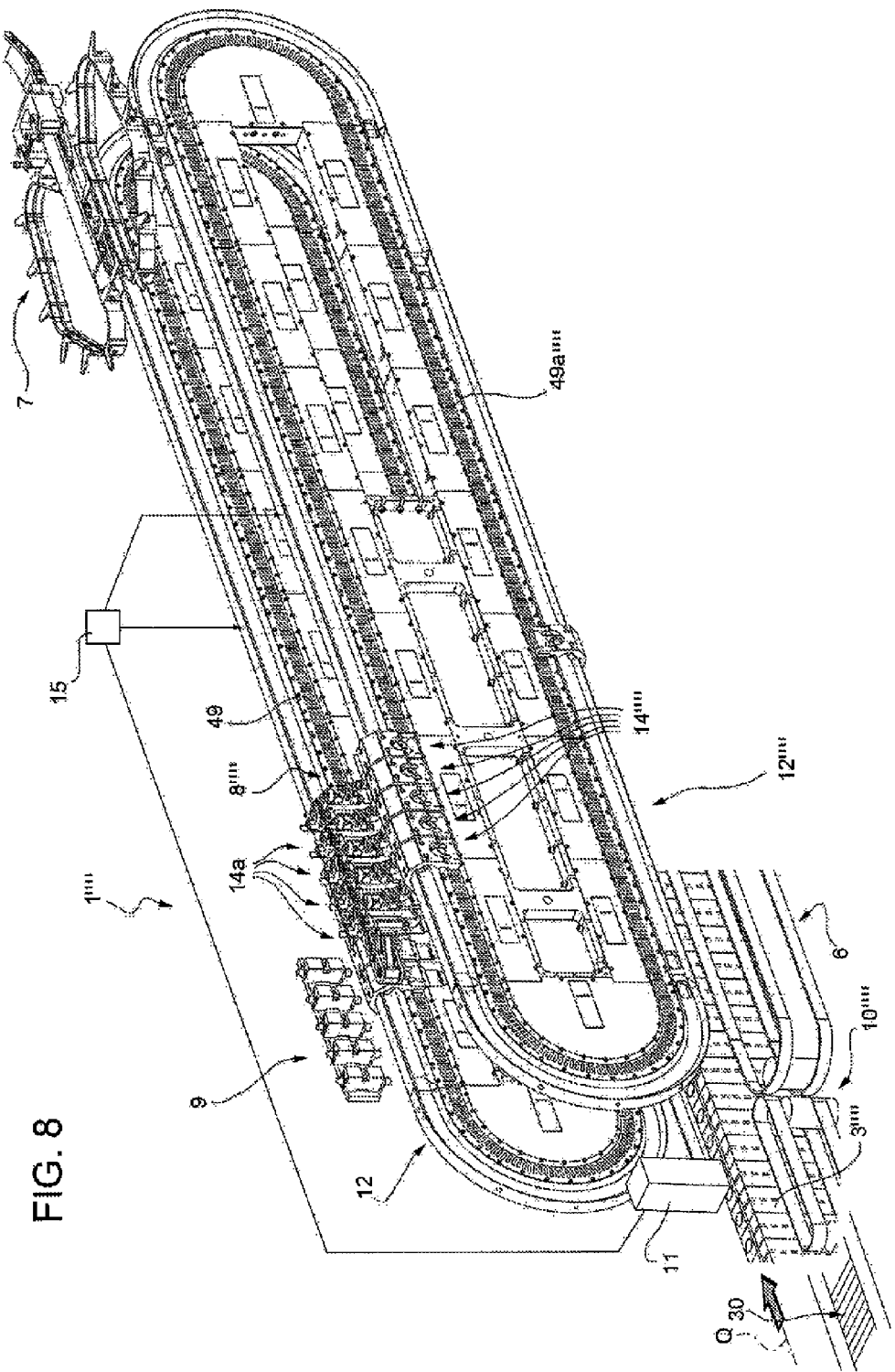
FIG. 8 is a perspective view of a fifth embodiment of a unit according to the invention, with parts removed for clarity.

With reference to FIGS. 6 and 7, 1'" indicates, as a whole, a unit for the application of opening devices 2'" to sealed packages 3'" according to a fourth embodiment of the present invention.

The unit 1'" is similar to unit 1 and will be described hereinafter only as far as it differs therefrom; corresponding or equivalent parts of units 1, 1'" will be indicated where possible by the same reference numbers.

In particular, unit 1'" is particularly adapted to apply reclosable opening devices 2'" onto respective packages 3'".

Each opening device 2'" substantially comprises (FIG. 7):
a planar frame 60'" which may be fitted to package 3'" and defines a pour opening for the food product; and
a closing element 61'" hinged to frame 60'" and movable between an open position in which it allows the pouring of the food product and a closed position in which it covers the pour opening.

Unit 1'" differs from unit 1 in that gluing assembly 9'" is a wheel applicator.

Unit 1'" also differs from unit 1 in that each gripping device 8'" is driven along path P'" by only one transfer element 14a'".

Accordingly, each gripping device 8'" may move only along direction X.

Each gripping device 8'" substantially comprises (FIG. 7):
a frame 21a'" connected to connection member 36a'" of relative transfer element 14a'" by a pair of crossbars 43'" parallel to direction Y;
a body 21b'" which may slide relative to frame 21a'" relative to direction Z;

an appendix 50'" which integrally protrudes from body 21b'" on the opposite side of track 12, and defines a seat 24'" for engaging a respective opening device 2'"; and
a pair of jaws 22'" (only one of which is shown in FIG. 7) hinged to appendix 50'" about relative axes parallel to direction X, elastically loaded into a closed position in which they retain respective opening device 2'" within seat 24'", and which may be moved into an open position in which they are parted from appendix 50'" and seat 24'" in order to permit engagement and release of relative opening device 2'".

Furthermore, each gripping device 8'" comprises:
a cam follower 38'" protruding from body 21b'" along direction Z and which cooperate with a not-shown fixed cam for displacing body 21b'" along direction Z between the retracted position and the extracted position; and
a cam follower 39'" which is carried by appendix 50'" cooperates with a not-shown further fixed cam for displacing, against the action of a not shown spring, jaws 22'" from the closed position into the open position at station I and along stretch P2 of path P'".

Crossbars 43'" are fixed to both connection member 36a'" and frame 21a'". Accordingly, crossbars 43'" remain parallel to direction Y along the whole path P'".

The operation of unit 1'" is similar to unit 1 and is described only insofar as it differs from that of unit 1.

In particular, each gripping device 8'" is driven by only one relative transfer element 14a'" along path P'" and direction X, but is stationary along direction Y.

Furthermore, gripping devices 8'" apply respective reclosable opening devices 2'" onto corresponding packages 3'".

With reference to FIGS. 8 to 10, 1'''' indicates, as a whole, a unit for the application of opening devices 2'''' to sealed packages 3'''' according to a fifth embodiment of the present invention.

The unit 1'''' is similar to unit 1 and will be described hereinafter only as far as it differs therefrom; corresponding or equivalent parts of units 1, 1'''' will be indicated where possible by the same reference numbers.

In particular, unit 1'''' differs from unit 1 for comprising:
a further endless track 12'''' arranged on the opposite side of track 12 relative to conveyor 30; and
a plurality of transfer elements 14'''' movable on track 12''''.

In the very same way of track 12 and transfer elements 14a, track 12'''' houses a stator armature 49'''' formed by a plurality of individually-excitable solenoids (known per se), and transfer elements 14'''' comprise respective carts 19'''' housing respective permanent magnets (known per se and only schematically shown in FIG. 1) and independently moved along track 12'''' by individually controlling the solenoids by means of control unit 15.

Furthermore, unit 1'''' differs from unit 1 in that each gripping device 8'''' is connected to only one transfer element 14a movable on track 12 and to a corresponding only one transfer element 14'''' movable on track 12''''.

Figure 10:
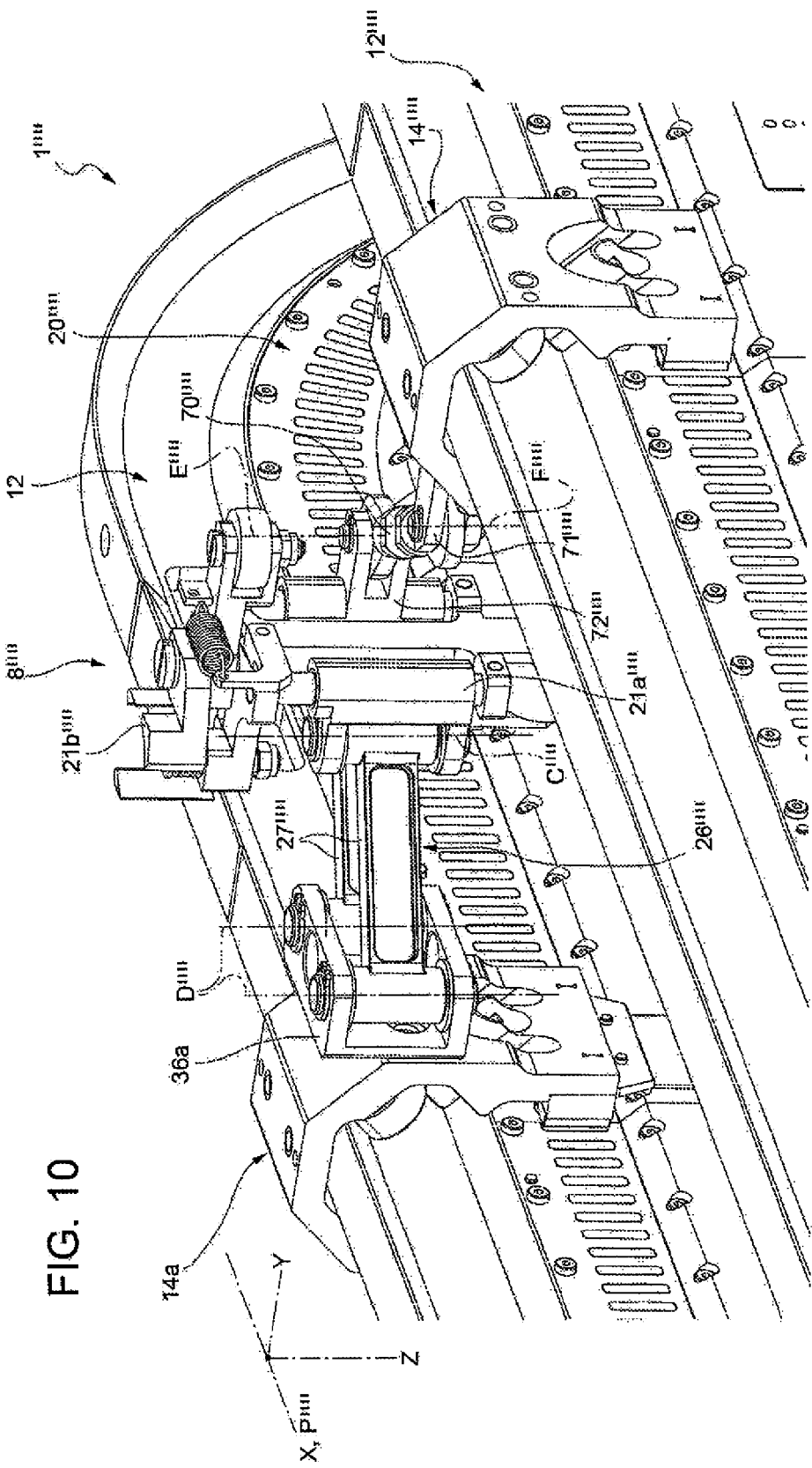
FIG. 10 is an enlarged perspective view of the unit of FIG. 9, with parts removed for clarity.

In other words, each transfer element 14a and corresponding transfer element 14'''' form a relative pair 20'" (FIG. 10).

Control unit 15 moves each gripping device 8'''' along directions X, Y by controlling the movement of respective transfer element 14a, 14'''' along respective tracks 12, 12''''.

In particular, control unit 15 controls the movement of each gripping device 8'''' along direction Y, by moving transfer element 14a, 14'''' at different speeds along respective tracks 12, 12''''.

Figure 9:
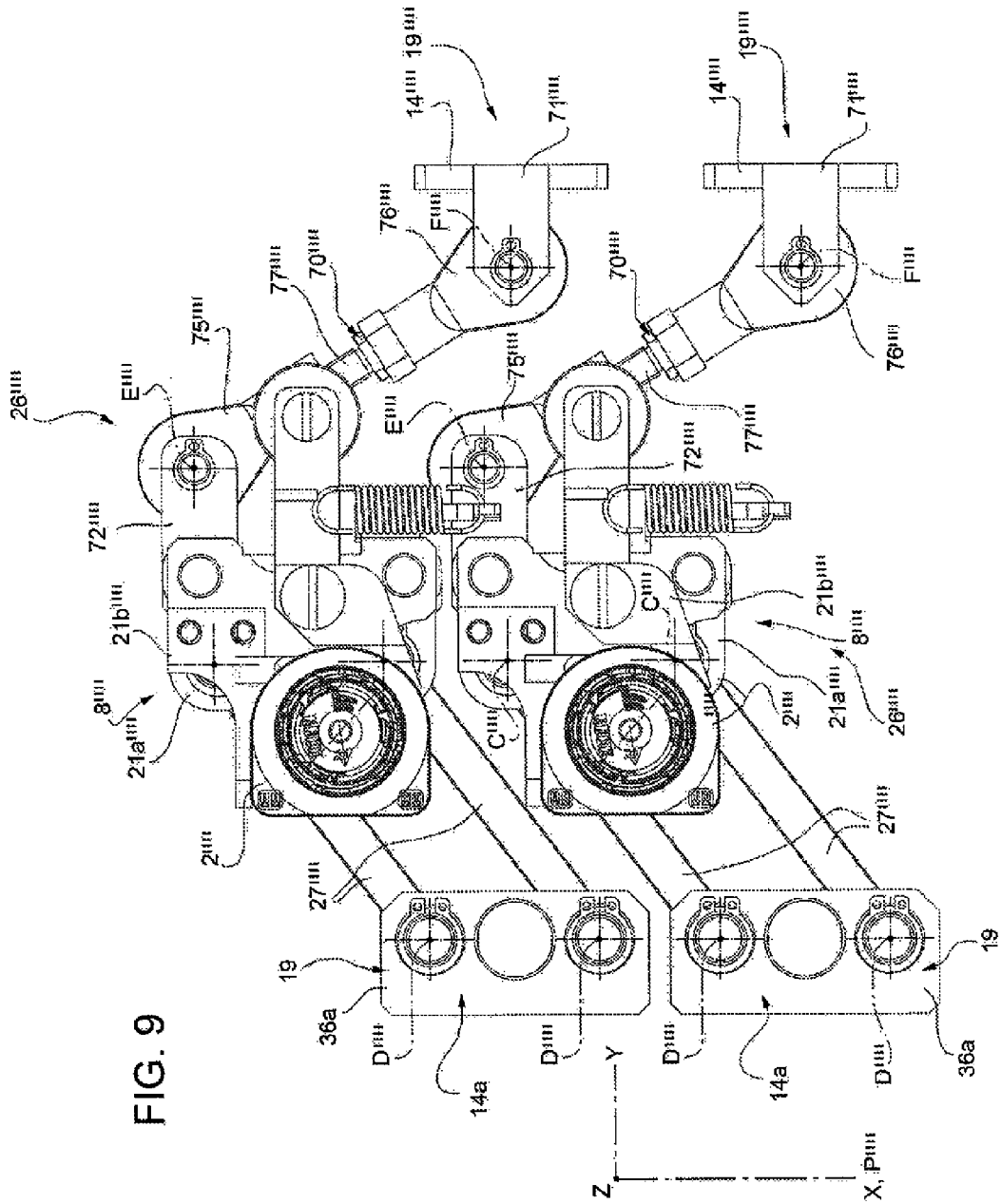
FIG. 9 is a top view of a gripping device of the unit of FIG. 8.

With particular reference to FIGS. 9 and 10, gripping device 8'''' differs from gripping device 8 in that leverage 26'''' comprises:
- a pair of levers 27'''' interposed between frame 21a'''' of gripping device 8'''' and connection element 36a of transfer element 14a; and
- a lever 70'''' interposed between frame 21a'''' of gripping device 8'''' and connection element 71'''' of transfer element 14''''.

Levers 27'''' are parallel to each other and are hinged to frame 21a'''' about axes C'''' parallel to direction Z and to connection element 36a about axis D'''' parallel to axes C''''.

Lever 70'''' is hinged about an axis E'''' parallel to axes C'''', D'''' to an appendix 72'''' of frame 21a'''' and is hinged about an axis F'''' parallel to E'''' about connection element 71'''' of transfer element 14a''''.

In this way, when transfer element 14a, 14'''' moves at the same speed along direction X, the angles defined by levers 27'''', 70'''' of respective gripping device 8'''' with direction X remain constant. Accordingly, gripping device 8'''' remains stationary along direction Y.

When transfer elements 14a, 14a'''' of same pair 20'''' move at differential speeds along direction X, the angles defined by levers 27'''', 70'''' of respective gripping device 8'''' with direction X changes. In other words, levers 27'''', 70'''' become more or less parallel to direction X, thus causing the displacement of respective gripping device 8'''' along direction Y.

In the embodiment shown, lever 70'''' comprises (FIG. 9):
- a spherical joint 75'''' hinged about axis E'''' to appendix 72'''';
- a spherical joint 76'''' hinged about axis F'''' to connection element 71'''' of transfer element 14a''''; and
- a rod 77'''' interposed between spherical joints 75'''', 76''''.

Spherical joints 75'''', 76'''' compensate the possible misalignments during the rotation of lever 70'''' about axis E'''', F''''.

The operation of unit 1'''' is similar to unit 1 and is described only insofar as it differs from that of unit 1.

In particular, control unit 15 controls both the movement of each transfer element 14a onto track 12 and of corresponding transfer element 14a'''' onto track 12''''. The movement of the above corresponding transfer element 14a, 14'''' causes the movement of relative gripping device 8'''' along direction X tangential to path P'''' and along direction Y transversal to path P''''.

Furthermore, the movement of each gripping device 8'''' along direction Y for receiving the adhesive substance along stretch P1 of path P'''' and for applying the opening device 2'''' in the correct position along stretch P2 of path P'''' is achieved by moving transfer element 14a, 14'''' of respective pair 20'''' at differential speed.

In this way, levers 27'''', 70'''' rotate about relative axes D'''', C'''', F'''', E'''', thus varying their inclination relative to direction X. As a result, gripping device 8'''' is displaced along direction Y.

Furthermore, the minimum pitch between transfer elements 14a along track 12 and between transfer elements 14'''' along track 12'''' is substantially the half of the minimum pitch between transfer elements 14a (14b) along track 12 of unit 1.

As a result, sequencing mechanism 10'''' does not need to create a gap between packages 3'''' upstream of stretch P2 of path P'''', even when those packages 3'''' have length L parallel to path Q smaller than the minimum pitch between transfer elements 14a and transfer assemblies 14b along track 12, but greater than the minimum pitch between transfer assemblies 14a along track 12 and between transfer assemblies 14'''' along track 12''''.

Figure 11:
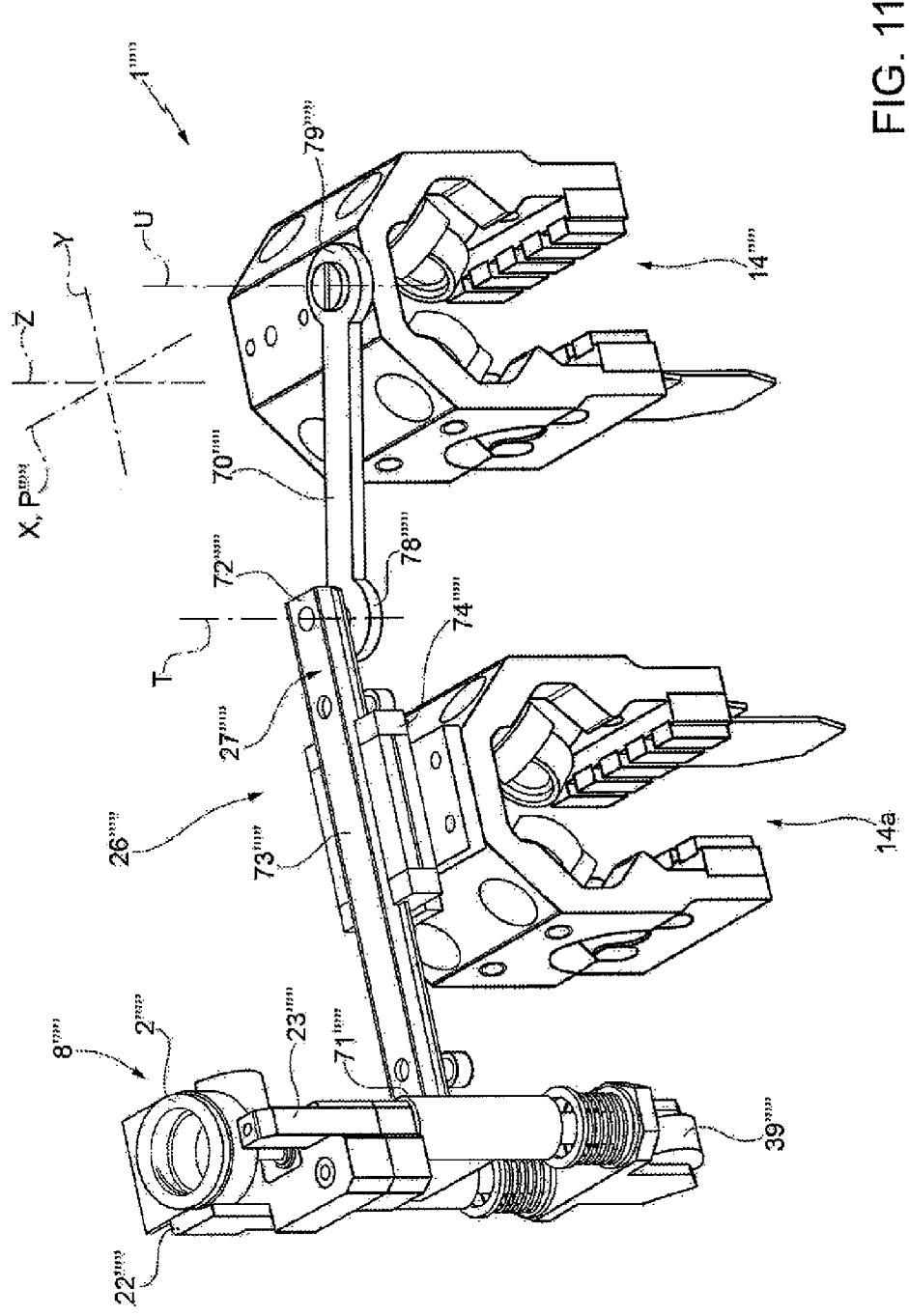
FIGS. 11 and 12 are perspective views of a gripping device of a sixth embodiment of the unit according to the invention, in two different operative positions.
Figure 12:
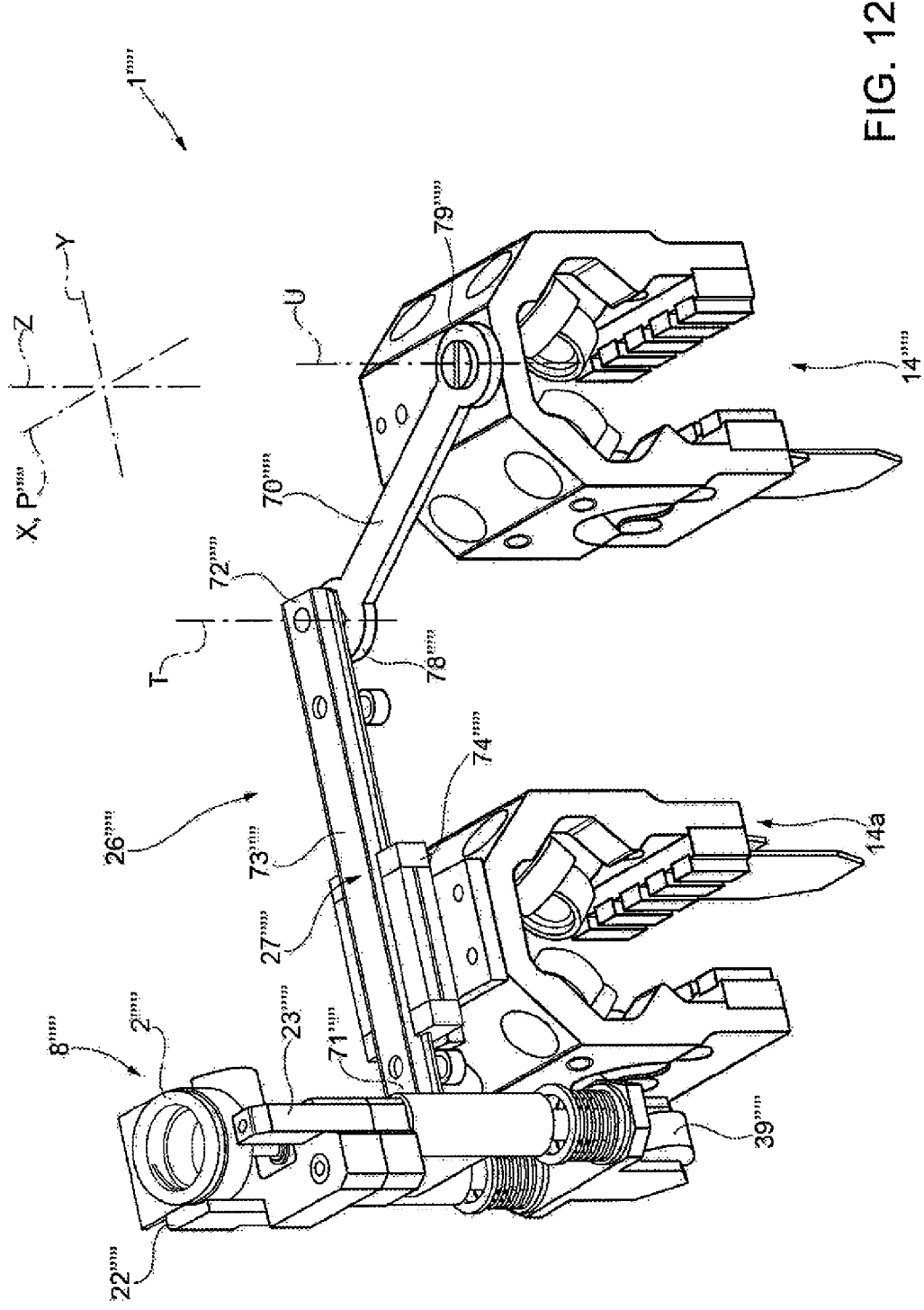

With reference to FIGS. 11 and 12, 1''''' indicates, as a whole, a unit for the application of opening devices 2'''' to sealed package 3'''' (not-shown in FIGS. 11 and 12), according to a sixth embodiment of the present invention.

The unit 1''''' is similar to unit 1'''' and will be described hereinafter only as far as it differs therefrom; corresponding or equivalent parts of unit 1'''', 1''''' will be indicated where possible by the same reference numbers.

In greater detail, unit 1''''' differs from unit 1'''' in that leverage 26''''' is not part of gripping device 8'''''.

Unit 1''''' also differs from unit 1'''' in that leverage 26''''' comprises:
- a lever 27''''' integral with gripping device 8'''''; and
- a lever 70''''' connected with transfer element 14''''' and articulated onto lever 27'''''.

Levers 27''''', 70''''' are hinged to one another about an axis T, which extends parallel to direction Z.

Lever 27''''' comprises:
- an end 71''''' from which gripping device 8''''' protrudes;
- an end 72''''' opposite to end 71'''''; and
- a portion 73''''' interposed between ends 71''''' 72''''' and sliding onto a guide 74''''', which is integral with transfer element 14a.

Lever 70''''' comprises:
- an end 78''''' hinged to end 72''''' about axis T; and
- an end 79''''', opposite to end 78''''' and hinged to transfer element 14''''' about an axis U parallel to axis T and direction Z.

In the embodiment shown, lever 27''''' extends along direction Y and slides parallel to direction Y inside guide 74''''', which is integral with transfer element 14a.

Furthermore, lever 70''''' rotates about axis T with respect to lever 27''''', thus causing gripping device 8''''' to move parallel to direction Y, when the mutual position along direction X of transfer element 14a, 14''''' varies.

Unit 1''''' further differs from unit 1'''' in that transfer element 14a is interposed along direction Y between gripping device 8''''' and transfer element 14'''''.

In use, in the same way as in unit 1'''', the movement of each gripping device 8''''' along direction Y for receiving the adhesive substance along stretch P1 of path P''''' and for applying opening device 2'''' in the correct position along stretch P2 of path P''''' is achieved by moving transfer elements 14a, 14''''' of respective pairs 20''''' at differential speed along direction X.

The operation of unit 1''''' is similar to unit 1'''' and is described hereinafter only insofar as it differs from that of unit 1''''.

In particular, the differential speed of transfer elements 14a, 14''''' along direction X causes the rotation of lever 70''''' about axis U with respect to transfer element 14''''' and about axis T with respect to lever 27''''' (FIG. 12).

The rotation of lever 70''''' about axis T causes, in turn, the sliding of lever 27''''' along direction Y onto guide 74''''' of transfer element 14a.

The sliding of lever 27''''' causes the integral movement of gripping device 8''''' along direction Y.

Figure 13:
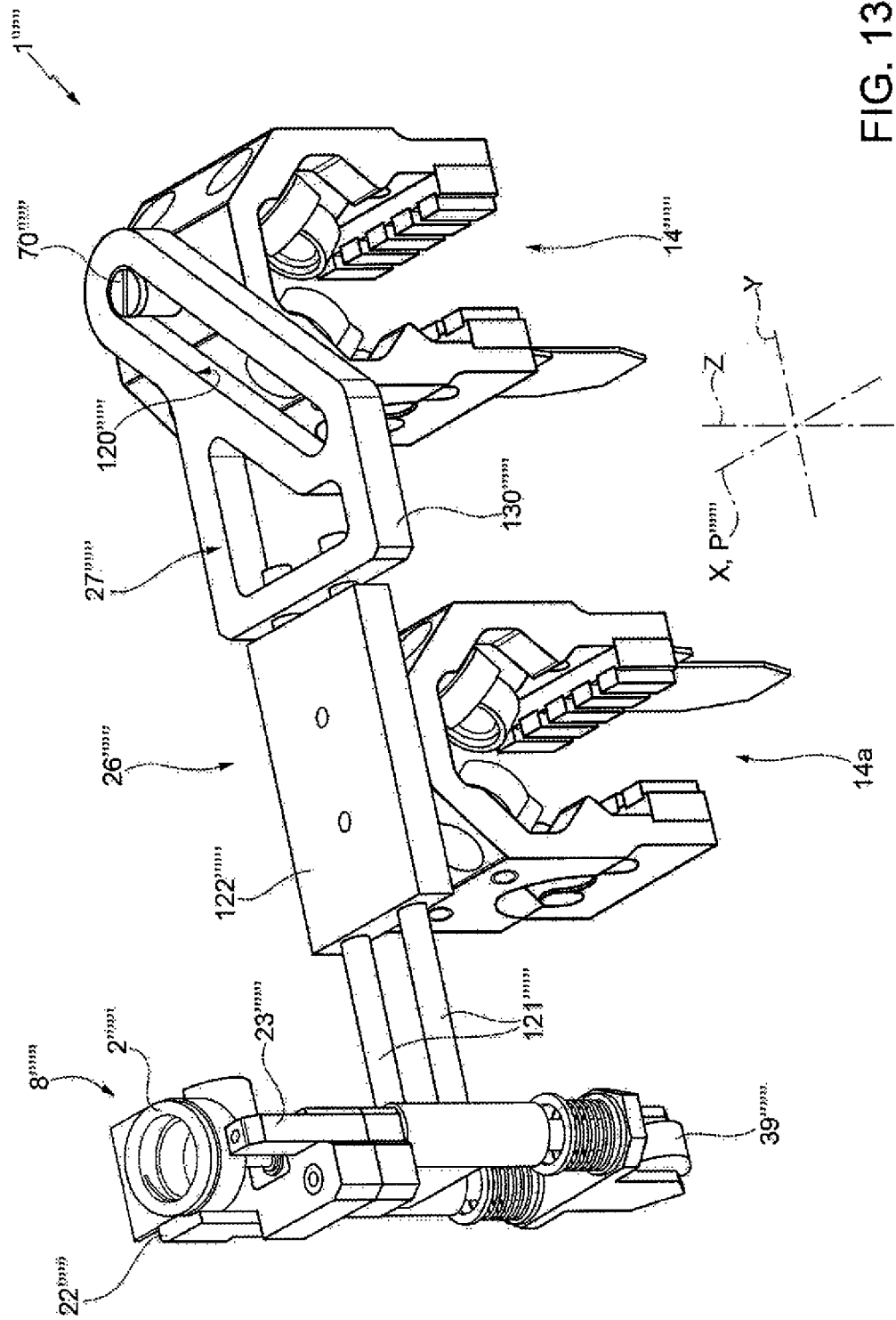
FIGS. 13 and 14 are perspective view of a gripping device of a seventh embodiment of the unit according to the invention, in two different operative positions.
Figure 14:
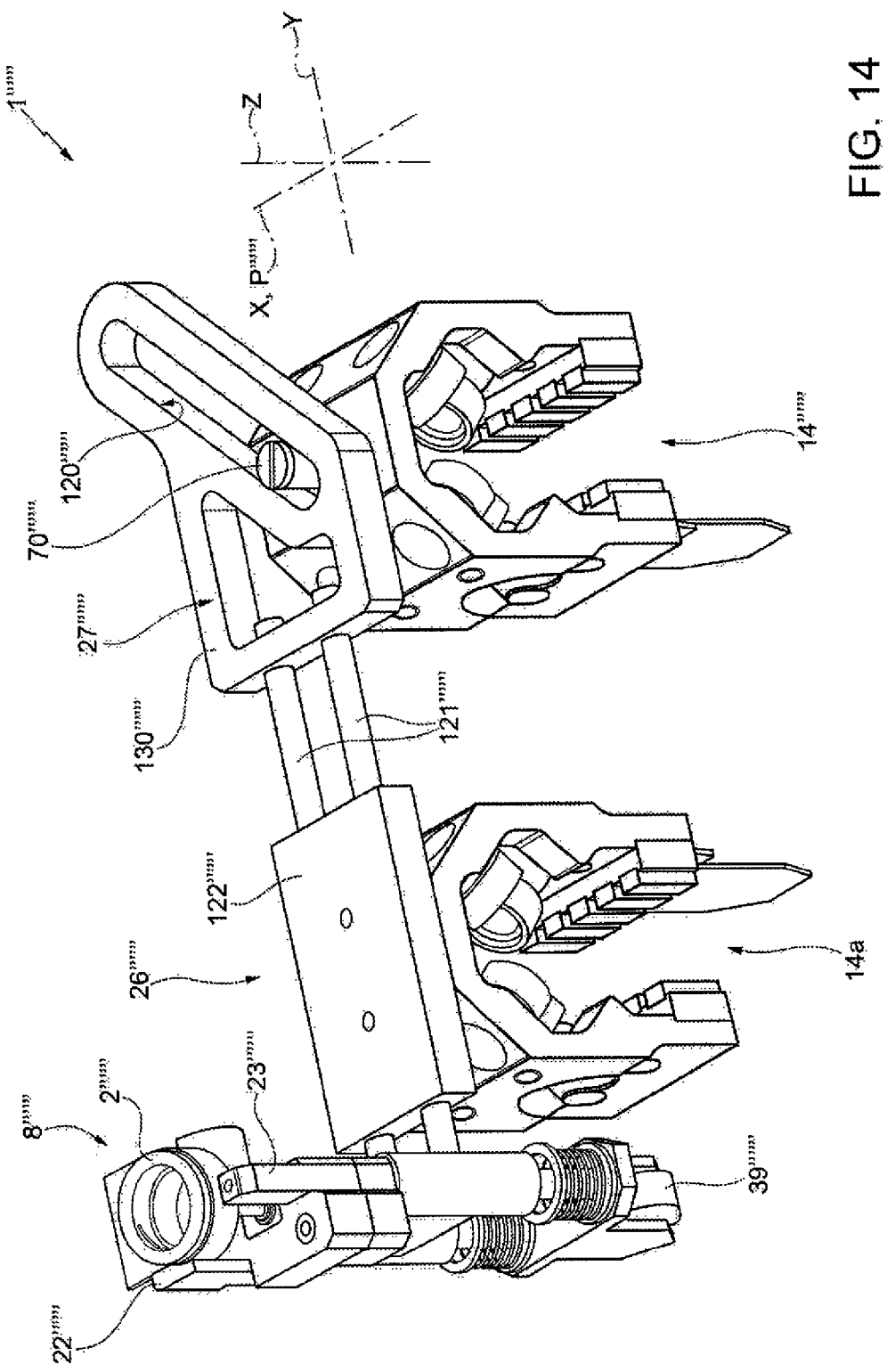

With reference to FIGS. 13 and 14, 1'''''' indicates, as a whole, a unit for the application of opening devices 2'''' to sealed package 3'''' (not shown in FIGS. 13 and 14) according to a seventh embodiment of the present invention.

The unit 1'''''' is similar to unit 1''''' and will be described hereinafter only as far as it differs therefrom; corresponding or equivalent parts of unit 1''''', 1'''''' will be indicated where possible by the same reference numbers.

In greater detail, unit 1′′′′′′ differs from unit 1′′′′′ in that leverage 26′′′′′′ comprises:
- an assembly 27′′′′′′, which defines a slot 120′′′′′′ and is connected to gripping device 8′′′′′′; and
- a pin 70′′′′′′, which engages slot 120′′′′′′ and is carried by transfer element 14′′′′′′.

Assembly 27′′′′′′ comprises:
- a plate 130′′′′′′, which lies in a plane orthogonal to direction Z and defines slot 120′′′′′′; and
- a pair of rods 121′′′′′′, which extend parallel to direction Y and are interposed between gripping device 8′′′′′′ and plate 130′′′′′′.

Rods 121′′′′′′ slide parallel to direction Y inside a guide 122′′′′′′ fixed to transfer element 14a.

Slot 120′′′′′′ passes through plate 130′′′′′′ parallel to direction Z, and extends transversally to directions X, Y and in a plane defined by directions X, Y.

Slot 120′′′′′′ defines a closed forced passage for pin 70′′′′′′. That passage is closed in the plane defined by directions X, Y.

The operation of unit 1′′′′′′ is similar to unit 1′′′′′ and is described hereinafter only insofar as it differs from that of unit 1′′′′′.

In particular, the differential speed of transfer elements 14a, 14′′′′′′ along direction X causes the sliding of pin 70′′′′′′ inside slot 120′′′′′′.

Due to the fact that slot 120′′′′′′ is sloped with respect to directions X, Y and pin 70′′′′′′ can only move parallel to direction X with transfer element 14′′′′′′, plate 130′′′′′′ slides parallel to direction Y with respect transfer element 14a as a result of the movement of pin 70′′′′′′ inside slot 120′′′′′′ (FIG. 14). Furthermore, the inclination of slot 120′′′′′′ with respect to direction X remains constant as pin 70′′′′′′ moves inside slot 120′′′′′′ (FIG. 14).

Accordingly, gripping device 8′′′′′′ moves parallel to direction Y when the speeds of transfer elements 14a, 14′′′′′′ along direction Y are different from one another.

In the embodiment shown, when transfer element 14′′′′′′ accelerates along direction X with respect to transfer element 14a, gripping device 8′′′′′′ moves parallel to direction Y and towards transfer elements 14a, 14′′′′′′ (see FIGS. 13 and 14).

From an analysis of the features of units 1, 1′, 1′′, 1′′′, 1′′′′, 1′′′′′, 1′′′′′′ made according to the present invention, the advantages it allows to obtain are apparent.

In particular, transfer elements 14a, 14b; 14a′′, 14b′′; 14a′′′; 14a, 14′′′′; 14a, 14′′′′′; 14a, 14′′′′′′ are self-movable and movable independently of each other.

Accordingly, each transfer element 14a, 14b; 14a′′, 14b′′; 14a′′′; 14a, 14′′′′; 14a, 14′′′′′; 14a, 14′′′′′′ may move along respective track 12, 12′′, 12′′′′ with a specific motion law.

In this way, it is possible to process differently shaped opening devices 2, 2′, 2′′, 2′′′, 2′′′′, 2′′′′′, 2′′′′′′ onto respective packages 3, 3′, 3′′, 3′′′, 3′′′′ along stretch P2 of path P, P′′, P′′′, P′′′′, P′′′′′ P′′′′′′ and/or apply the adhesive substance following differently shaped patterns along stretch P1 of path P, P′′, P′′′, P′′′′, P′′′′′, P′′′′′′, by simply changing the motion law of transfer elements 14a, 14b; 14a′′, 14b′′; 14a′′′; 14a, 14′′′′; 14a, 14′′′′′; 14a, 14′′′′′′ and without substantially re-configuring gluing assembly 9 or the gripping device 8, 8′, 8′′, 8′′′, 8′′′′, 8′′′′′ 8′′′′′′.

For the same reasons, the cycle-time of the application of the adhesive substance along stretch P1 of path P, P′′, P′′′, P′′′′, P′′′′′, P′′′′′′ is completely independent of the cycle-time of the application of opening devices 2, 2′, 2′′, 2′′′, 2′′′′, 2′′′′′, 2′′′′′′ onto respective packages 3, 3′, 3′′, 3′′′, 3′′′′, thus highly enhancing the flexibility of unit 1, 1′, 1′′, 1′′′, 1′′′′, 1′′′′′, 1′′′′′′.

Furthermore, there is no need of synchronizing packages 3, 3′, 3′′, 3′′′, 3′′′′ with gripping device 8, 8′, 8′′, 8′′′, 8′′′′, 8′′′′′, 8′′′′′′ upstream of stretch P2 of path P, P′′, P′′′, P′′′′, P′′′′′, P′′′′′′.

As a matter of fact, control unit 15 controls the motion law of transfer elements 14a, 14b; 14a′′, 14b′′; 14a′′′; 14a, 14′′′′; 14a, 14′′′′′; 14a, 14′′′′′′ in such a way that respective gripping devices 8, 8′, 8′′, 8′′′, 8′′′′, 8′′′′′, 8′′′′′′ are synchronized with packages 3, 3′, 3′′, 3′′′, 3′′′′ along stretch P2 of path P, P′′, P′′′, P′′′′, P′′′′′, P′′′′′′.

In view of the above advantages, the Applicant has found that the throughput of unit 1, 1′, 1′′, 1′′′, 1′′′′, 1′′′′′, 1′′′′′′ may be easily greater than the one of the known unit and is greater than 40000 packages/hour.

Leverages 26, 26′′′′, 26′′′′′, 26′′′′′′ convert a variation in the mutual position of respective pairs of transfer element 14a, 14b; 14a′′, 14b′′; 14a′′′; 14a, 14′′′′; 14a, 14′′′′′; 14a, 14′′′′′′ along direction X in the displacement of relative gripping device 8, 8′, 8′′, 8′′′, 8′′′′, 8′′′′′, 8′′′′′′ along direction Y.

In this way, it is possible both to apply adhesive substance along differently shaped patterns onto opening devices 2, 2′, 2′′, 2′′′, 2′′′′, 2′′′′′, 2′′′′′′ and to apply differently shaped opening devices 2, 2′, 2′′, 2′′′, 2′′′′, 2′′′′′, 2′′′′′′ onto respective packages 3, 3′, 3′′, 3′′′′ with a high precision and only by controlling the speed of transfer element 14a, 14b; 14a′′, 14b′′; 14a′′′; 14a, 14′′′′; 14a, 14′′′′′; 14a, 14′′′′′′ onto tracks 12, 12′′, 12′′′′.

Due to the presence of guide element 100′, unit 1′ allows to incline gripping devices 8′ relative to path Q. In this way, gripping devices 8′ may apply corresponding opening device 2′ onto relative packages 3′ having wall 4′ slanted relative to axis A.

Unit 1′′ comprises a further track 12′′ arranged downstream of track 12 along path Q, with reference to advancing direction of packages 2′′.

In this way, unit 1′′ may process also packages 2′′ having length L measured parallel to path Q smaller than the minimum pitch of transfer elements 14a (14b) and 14a′′, 14b′′ onto track 12, 12′′ respectively, without distancing packages 3, 3′′ from each other upstream of track 12, 12′′.

As a matter of fact, in order to process the above kind of packages 3, 3′′, it is enough that gripping devices associated to track 12 apply opening devices 2 onto packages 3 and gripping devices 8′′ associated to track 12′′ apply opening device onto packages 3′′ contacting and immediately subsequent of packages 3.

Unit 1′′′′, 1′′′′′, 1′′′′′′ is particularly advantageous, because each gripping device 8′′′′, 8′′′′′, 8′′′′′′ is moved by a respective self-movable transfer element 14a onto track 12 and by a respective self-movable transfer elements 14′′′′, 14′′′′′, 14′′′′′′ onto track 12′′′′.

As a result, the pitch between transfer elements 14a and between transfer elements 14′′′′, 14′′′′′, 14′′′′′′ may be made substantially an half of the pitch between transfer elements 14a (14b) or 14a′′ (14b′′) in unit 1, 1′, 1′′.

Accordingly, unit 1′′′′, 1′′′′′, 1′′′′′′ may process also packages 2′′′′ having a particularly small length L measured along path Q, without the need of an additional track 12′′ along path Q and without the need of distancing packages 2′′′′ by a given gap upstream from stretch P2 of path P′′′′, P′′′′′, P′′′′′′.

Clearly, changes may be made to units 1, 1′, 1′′, 1′′′, 1′′′′, 1′′′′′, 1′′′′′′ as described and illustrated herein without, however, departing from the scope as defined in the accompanying claims.

In particular, stator armature 49, 49′′, 49′′′′ may be carried by transfer elements 14a, 14b; 14a′′, 14b′′; 14a′′′; 14a, 14′′′′ and permanent magnets may be carried by track 12, 12′′, 12′′′′.

Furthermore, unit 1' and 1" (FIGS. 4 and 5) could be provided with gripping devices 8''' (FIG. 6) instead of gripping device 8, 8". In this case, each gripping device 8''' would be connected to track 12, 12" by a relative transfer element 14''' and would be movable only along direction X, and would apply a relative opening device 2''' onto relative packages 3, 3', 3".

The invention claimed is:

1. A unit for the application of opening devices on respective sealed first packages of food products, comprising:
    at least one first gripping device configured to receive, in use, a relative said opening device and movable along a first path;
    said first path comprising a first stretch in which said opening device is applied onto said package by said at least one first gripping device;
    a first track;
    a first transfer element, which is operatively connected to said first gripping device; and
    at least one second transfer element;
    wherein said first transfer element is movable along said first track, and said first transfer element is movable relative to and independently of said second transfer element.

2. The unit of claim 1, comprising:
    a sensor adapted to generate a signal associated to the position of said first package; and
    an electronic control unit configured for receiving, in use, said signal and for controlling, in use, the movement of said first transfer element.

3. The unit of claim 1, wherein also said second transfer element is movable and operatively connected to said first gripping device.

4. The unit of claim 3, wherein said first gripping device is driven, in use, by said first transfer element and said second transfer element along a first direction tangential to said path;
    said unit comprising connecting means for connecting said first transfer element and said second transfer element to said first gripping device;
    said connecting means being configured to transform a variation in a mutual position along said first direction between said first transfer element and second transfer element into a displacement of said first gripping device along a second direction orthogonal to said first direction.

5. The unit of claim 4, wherein said first transfer element and said second transfer element are movable on said first track along said first direction.

6. The unit of claim 4, wherein said connecting means comprise:
    a first lever articulated on said first transfer element and on said first gripping device; and
    a second lever articulated on said second transfer element and on said first lever;
    said first lever and second lever converting, in use, a variation in the mutual position of said first transfer element relative to said second transfer element into a translation of said first gripping device parallel to said second direction.

7. The unit of claim 1, comprising:
    a second gripping device configured to receive, in use, a relative opening device and movable along a third path which is arranged downstream of said first path, proceeding according to an advancing direction, in use, of said packages; and
    a movable third transfer element which is operatively connected to said second gripping device for conveying said second gripping device along said third path.

8. The unit of claim 7, wherein said first gripping device is controllable for applying a first opening device onto said first package, and in that said second gripping device is controllable for applying a second opening device onto a second package which is adjacent and immediately subsequent to said first package.

9. The unit of claim 7, comprising a second track arranged downstream of said first track, proceeding parallel to an advancing direction of said first and second package;
    said third transfer element being movable on said second track.

10. The unit of claim 9, comprising a fourth transfer element movable along said second track and operatively connected to said second gripping device; and
    said third transfer element and said fourth transfer element being movable independently of each other.

11. The unit of claim 1, comprising:
    a guide arranged on an opposite side of said first gripping device relative to said first track; and
    a slider which may slide on said guide and which is operatively connected to said first gripping device.

12. The unit of claim 11, comprising conveying means for conveying said first package along a second path partially superimposed to said first stretch of said first path;
    said first track and said guide comprising a respective first branch and a second branch;
    said first transfer element being movable on said first branch and said slider being movable on said second branch, when said first gripping device moves along said first stretch of said first path;
    said first branch and second branch defining a plane inclined relative to said first direction, so that said first gripping device is, in use, inclined relative to said first direction when the first gripping device travels along said first stretch of said path.

13. The unit of claim 12, wherein said first gripping device is articulated on said slider.

14. The unit of claim 12, wherein said second transfer element is movable on said first branch, when said first gripping device moves along said first stretch of said first path.

15. The unit of claim 1, comprising a further track along which said second transfer element is movable.

16. The unit of claim 15, comprising connecting means for connecting said first transfer element and said second transfer element to said first gripping device, said connecting means being configured to transform a variation in a mutual position along said first direction between said first transfer element and second transfer element into a displacement of said first gripping device along a second direction orthogonal to said first direction, wherein said connecting means comprise:
    a third lever integral with said first gripping device and movable relative to said first transfer element; and
    a fourth lever, which is articulated on said third lever and on said second transfer element.

17. The unit of claim 16, wherein said third lever is slidable with respect to said first transfer element parallel to said second direction.

18. The unit of claim 16, wherein said third lever and said fourth lever are hinged to each other about a first axis transversal to said first direction and second direction.

19. The unit of claim 16, wherein said fourth lever is hinged to said second transfer element about a second axis transversal to said first direction and second direction.

20. The unit of claim 16, wherein said first transfer element is interposed along said second direction between said first gripping device and said second transfer element.

21. The unit of claim 15, comprising connecting means for connecting said first transfer element and said second transfer element to said first gripping device, said connecting means being configured to transform a variation in a mutual position along said first direction between said first transfer element and second transfer element into a displacement of said first gripping device along a second direction orthogonal to said first direction, wherein said connecting means comprise:
- a first connecting element, which defines a slot and is connected to one of said first gripping device and said second transfer element; and
- a second connecting element, which defines a body slidably engaging said slot and is connected to the other one of said first gripping device and said second transfer element;
- said slot being transversal to both said first direction and said second direction.

22. The unit of claim 21, wherein said first connecting element is connected with said first gripping device and in that said second connecting element is connected with said second transfer element.

23. The unit of claim 22, wherein said first connecting element is slidable with respect to said first transfer element.

24. The unit of claim 23, wherein said first connecting element is slidable along said second direction with respect to said first transfer element.

25. The unit of claim 1, wherein said first gripping device is interposed between said first transfer element and said second transfer element.

26. The unit of claim 25, comprising connecting means for connecting said first transfer element and said second transfer element to said first gripping device, said connecting means being configured to transform a variation in a mutual position along said first direction between said first transfer element and second transfer element into a displacement of said first gripping device along a second direction orthogonal to said first direction, wherein said connecting means comprise:
- a third lever articulated on said first transfer element and on said first gripping device; and
- a fourth lever articulated on said second transfer element and on said first gripping device.

27. The unit of claim 1, wherein said path comprises a second stretch in which an adhesive substance is applied, in use, onto said opening device and in that said opening device is covered with said adhesive substance is applied onto said package in said first stretch.

* * * * *